United States Patent
Sakurai (10) Patent No.: US 8,293,387 B2
(45) Date of Patent: Oct. 23, 2012

(54) MAGNETIC RECORDING MEDIUM AND METHOD OF MANUFACTURING THE SAME

(75) Inventor: Masatoshi Sakurai, Tokyo (JP)

(73) Assignee: Kabushiki Kaisha Toshiba, Tokyo (JP)

(*) Notice: Subject to any disclaimer, the term of this patent is extended or adjusted under 35 U.S.C. 154(b) by 460 days.

(21) Appl. No.: 12/548,364

(22) Filed: Aug. 26, 2009

(65) Prior Publication Data

US 2009/0317661 A1 Dec. 24, 2009

Related U.S. Application Data (63) Continuation of application No. PCT/JP2008/071912, filed on Nov. 26, 2008.

(30) Foreign Application Priority Data

Dec. 27, 2007 (JP) ................................. 2007-338215

(51) Int. Cl.
  *G11B 5/66* (2006.01)
(52) U.S. Cl. ........................................................ 428/827
(58) Field of Classification Search .................... None
  See application file for complete search history.

(56) References Cited

U.S. PATENT DOCUMENTS

| 4,935,278 A | 6/1990 | Krounbi et al. | |
| 6,153,281 A * | 11/2000 | Meyer et al. | 428/848.5 |
| 6,168,845 B1 | 1/2001 | Fontana, Jr. et al. | |
| 2006/0063042 A1 * | 3/2006 | Takai et al. | 428/848.2 |
| 2006/0222897 A1 * | 10/2006 | Kamata et al. | 428/826 |

FOREIGN PATENT DOCUMENTS

| JP | 05-047918 | 2/1993 |
| JP | 05-159272 | 6/1993 |
| JP | 2006-092632 | 4/2006 |
| WO | WO 03/019540 A1 | 3/2003 |

OTHER PUBLICATIONS

Explanation of Non-English Language References.

* cited by examiner

*Primary Examiner* — Holly Rickman
*Assistant Examiner* — Linda Chau
(74) *Attorney, Agent, or Firm* — Knobbe, Martens, Olson & Bear, LLP (57) ABSTRACT

A magnetic recording medium has recording regions including patterns of a magnetic material corresponding to servo signals and recording tracks, non-recording regions including an oxide of the magnetic material formed between the recording regions, and surface oxide films including an oxide of the magnetic material formed on surfaces of the recording regions.

3 Claims, 4 Drawing Sheets

MAGNETIC RECORDING MEDIUM AND METHOD OF MANUFACTURING THE SAME

CROSS-REFERENCE TO RELATED APPLICATIONS

This is a Continuation Application of PCT Application No. PCT/JP2008/071912, filed Nov. 26, 2008, which was published under PCT Article 21(2) in English.

This application is based upon and claims the benefit of priority from Japanese Patent Application No. 2007-338215, filed Dec. 27, 2007, the entire contents of which are incorporated herein by reference.

BACKGROUND

1. Field

The present invention relates to a magnetic recording medium and a method of manufacturing the same.

2. Description of the Related Art

In order to improve recording density of a magnetic recording medium, a discrete track type magnetic recording medium using discrete tracks is effective in which non-recording regions, where magnetic recording cannot be performed, are formed by removing or modifying the magnetic material between recording tracks on the recording medium and which is capable of suppressing interference in reading from and writing to an adjacent track.

As a method of manufacturing a discrete track medium, there has been known a method of patterning a magnetic material deposited on a substrate for the purpose of forming the magnetic material into such a structure that desired servo signals and recording tracks are isolated. For example, there is known a method in which the magnetic material at the portions corresponding to the non-recording regions is removed, and then recesses where the magnetic material has been removed are filled with a filling material to flatten the surface of the medium. Alternatively, there is known another method in which the magnetic material at the portions corresponding to the non-recording regions is chemically modified to locally deactivate the magnetic material, thereby patterning the magnetic material (for example, Jpn. Pat. Appln. KOKOKU Publication No. 5-47918).

In the discrete track type magnetic recording media provided by using the above methods, since the magnetic material is locally modified or the recesses between the magnetic material are filled with a different material, interfaces are produced between the magnetic material constituting recording regions and the non-recording regions in the medium. The interfaces are continuously formed to the surface of the magnetic recording layer and usually separated from the air only by a protective film.

However, voids may be produced at the interfaces between different materials due to difference in thermal expansion coefficients and difference in surface energy, represented by hydrophilic and hydrophobic properties, of the two materials. The voids produced in the medium often become a cause of so-called corrosion. Specifically, when the protective film has an incomplete structure, mainly water in the air enters the medium through the protective layer and along the interfaces to induce the corrosion. When the corrosion occurs, chemicals may be precipitated on the medium surface.

SUMMARY OF THE INVENTION

As described above, the conventional discrete track type magnetic recording medium, manufactured by processing or modifying a magnetic film deposited in advance, has a problem of occurrence of corrosion.

According to an aspect of the present invention, there is provided a magnetic recording medium comprising: recording regions comprising patterns of a magnetic material corresponding to servo signals and recording tracks; non-recording regions comprising an oxide of the magnetic material formed between the recording regions; and surface oxide films comprising an oxide of the magnetic material formed on surfaces of the recording regions.

According to another aspect of the present invention, there is provided a method of manufacturing a magnetic recording medium comprising: depositing a magnetic material on a substrate; forming masks on portions of the magnetic material corresponding to recording regions; oxidizing the magnetic material in portions uncovered with the masks to form non-recording regions together with recording regions comprising patterns of the magnetic material isolated by the non-recording regions; removing the masks; and oxidizing the magnetic material on surfaces of the recording regions to form surface oxide films comprising an oxide of the magnetic material.

DETAILED DESCRIPTION

Figure 1:
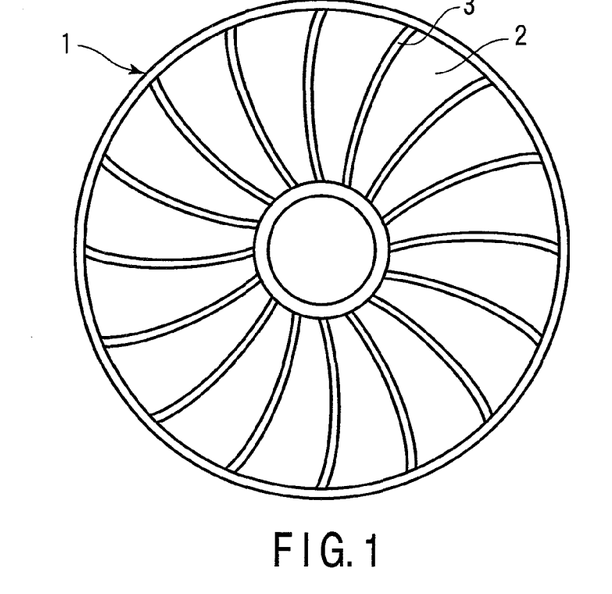
FIG. 1 is a schematic plan view of a magnetic recording medium according to the present invention.

FIG. 1 shows a schematic plan view of a magnetic recording medium (DTR medium) 1 according to the present invention. FIG. 1 shows data zones 2 and servo zones 3. The data zone 2 is a zone in which user data is recorded. The servo zone 3 on the medium surface has a circular arc shape corresponding to a locus drawn when a head slider accesses the medium. The length of the servo zone 3 in the circumferential direction is formed so as to be longer as the radial position is on more outer peripheral side. Although 15 servo zones 3 are illustrated in FIG. 1, 100 or more servo zones 3 are formed in the actual medium.

Figure 2:
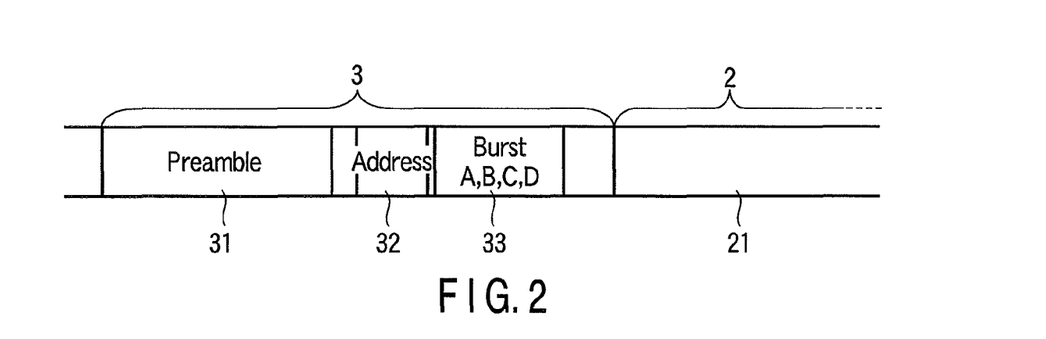
FIG. 2 is a schematic view of a servo zone and a data zone.
Figure 3:
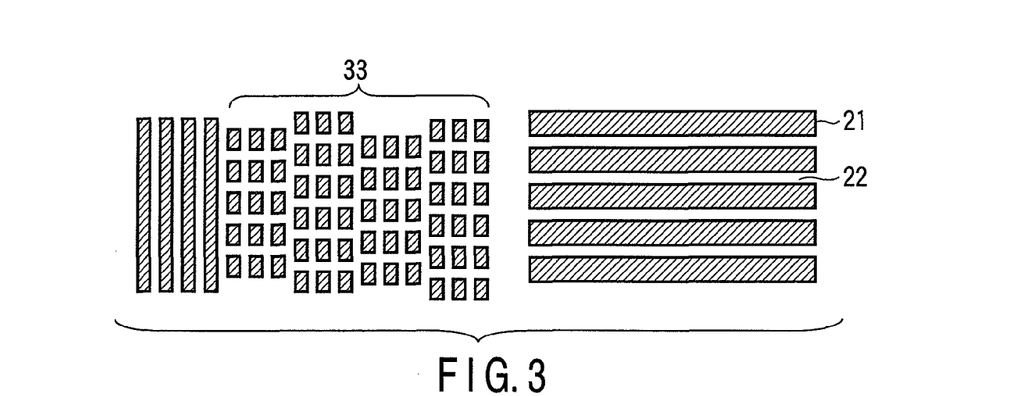
FIG. 3 is a plan view showing patterns of the servo zone and the data zone.

FIG. 2 is a schematic view of a servo zone and a data zone. FIG. 3 shows patterns of recording regions and non-recording regions in the servo zone and the data zone. As shown in these figures, the data zones 2 are divided into sectors in the circumferential direction by the servo zones 3.

In the data zone 2, recording tracks (discrete tracks) 21 as recording regions are formed at a predetermined track pitch Tp. The user data is recorded in the recording track 21. The recording tracks 21 adjacent to each other in the cross-track direction are separated by a non-recording region 22.

The servo zone 3 includes a preamble part 31, an address part 32 and a burst part 33. Patterns of the recording regions and the non-recording regions providing servo signals are formed in the preamble part 31, the address part 32 and the burst part 33 in the servo zone 3. These parts have the following functions.

The preamble part 31 is provided for performing PLL processing for synchronizing a servo signal read clock with respect to the time lag occurring due to the rotational deviation of the medium and AGC processing for properly maintaining signal read amplitude. In the preamble part 31, protruded recording regions which continue radially without being divided in the radius direction and have a substantially circular-arc shape are repeatedly formed in the circumferential direction.

The address part 32 has a servo signal recognition code called a servo mark, sector data, and cylinder data, which are formed in Manchester code at the same pitch as the circumferential pitch of the preamble part 31. In particular, since the cylinder data is formed as patterns the data of which changes every servo track, it is converted into a gray code, in which change of the code from the adjacent track is made minimum, and then is recorded in Manchester code so that influence of address read error in seek operation can be reduced.

The burst part 33 is an off-track detection region for detecting the off-track amount from the cylinder address in the on-track state, where four types of marks (called A, B, C, and D bursts) having shifted pattern phases in the radial direction are formed. In each of the A, B, C and D bursts, marks are arranged in the circumferential direction at the same pitch as that in the preamble part. The cycle of each burst in the radial direction is in proportion to the cycle of change in the address pattern, in other words, the servo track cycle. Each burst is formed in about 10 cycles in the circumferential direction and is repeatedly formed at twice the servo track cycle in the radial direction.

The shape of the marks in the burst part 33 is designed so as to have a rectangular shape, or, in a strict sense, a parallelogram shape in consideration of the skew angle in the head access; however, the marks are formed in a somewhat rounded shape depending on processing accuracy of a stamper and performance of processing such as transfer formation. The marks may be formed as the non-recording regions or the recording regions. Although a detailed description of the principle of position detection from the burst part 33 is omitted, average amplitude values of read signals from the A, B, C and D bursts are processed to calculate the off-track amount.

Figure 4:
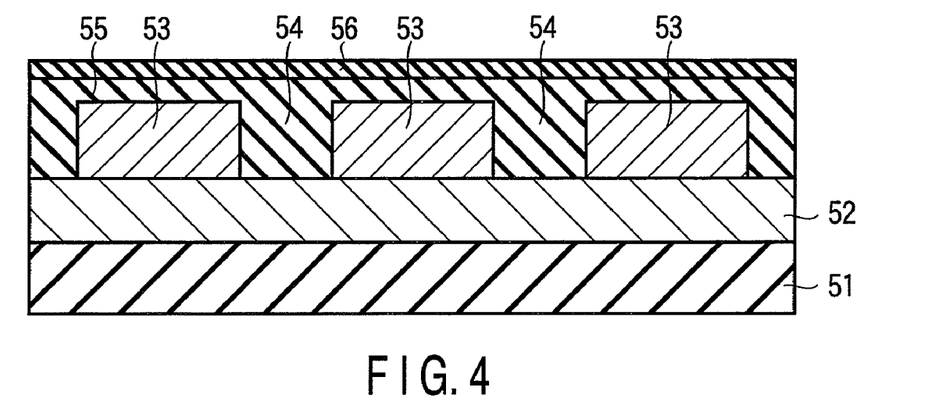
FIG. 4 is a cross-sectional view of a magnetic recording medium according to an embodiment of the present invention.

FIG. 4 shows a cross-sectional view of the DTR medium according to an embodiment of the present invention. In FIG. 4, a soft magnetic underlayer 52 is formed on a substrate 51. Recording regions 53 made of patterned magnetic material comprising ferromagnetic crystals are formed on the soft magnetic underlayer 52 corresponding to servo signals and recording tracks. The ferromagnetic crystals constituting the recording region 53 are magnetized with a write head, and the magnetization is read out with a read head, whereby write and read can be performed. Non-recording regions 54 comprising an oxide of a magnetic material of the recording region is formed between the recording regions 53. The oxide of the magnetic material constituting the non-recording region 54 reaches the surface of the soft magnetic underlayer 52. The oxide constituting the non-recording regions 54 does not have a magnetic property, making it possible to isolate the adjacent discrete tracks. Also, surface oxide films 55 comprising the oxide of the magnetic material of the recording regions are formed on the surfaces of the recording regions 53. A protective film 56 is formed on the non-recording regions 54 and the surface oxide films 55.

In the magnetic recording medium according to the present invention, the oxide constituting the non-recording region 54 and the oxide constituting the surface oxide film 55 are the same oxide of the magnetic material of the recording region, and integrated with each other without producing an interface. The peripheries of the recording regions 53 are covered with the same oxide and the interfaces between the recording regions 53 and the non-recording regions 54 are not exposed to the surfaces of the magnetic recording layer just below the protective film 56, and therefore, the penetration of water through the interfaces does not occur, whereby corrosion can be prevented. Accordingly, the discrete track type magnetic recording medium according to the present invention provides an effect that the corrosion resistance can be improved.

In order to prevent water from penetrating through the interfaces between the recording regions 53 and the non-recording regions 54 in the magnetic recording layer, it is preferable that the oxide constituting the surface oxide films 55 on the surfaces of the recording regions 53 has a sufficient thickness. On the basis of the corrosion test under an environment of high temperature and humidity, it has been founded that the thickness of the surface oxide film 55 is preferably 1 nm or more at the boundaries between the recording regions 53 and the non-recording regions 54.

However, if the thickness of the oxide constituting the surface oxide films 55 formed on the surfaces of the recording regions 53 is too large, the distance, i.e., the magnetic spacing, between the head and the recording region 53 in read and write is increased, resulting in signal deterioration. Thus, the thickness of the surface oxide films 55 on the surfaces of the recording regions 53 is preferably 1 nm or more and 3 nm or less.

Figure 5:
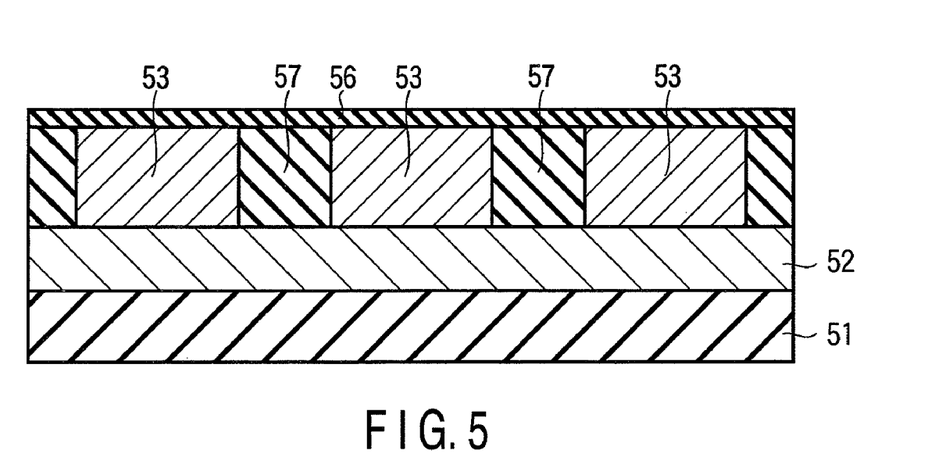
FIG. 5 is a cross-sectional view of a conventional magnetic recording medium.

On the other hand, FIG. 5 shows a cross-sectional view of an example of the conventional DTR medium. In FIG. 5, a soft magnetic underlayer 52 is formed on a substrate 51. Recording regions 53 patterned by processing the magnetic material corresponding to servo signals and recording tracks are formed on the soft magnetic underlayer 52. Non-recording regions 57 are formed by filling the recesses between the recording regions 53 with a non-magnetic filling material. The protective film 56 is formed on the recording regions 53 and the non-recording regions 57.

In the conventional DTR medium shown in FIG. 5, the interfaces between the magnetic material of the recording regions 53 and the filling material constituting the non-recording regions 57 are exposed to the surface of the magnetic recording layer just below the protective film 56. Therefore, water penetrates through the interfaces and causes chemical reaction with the magnetic material, bringing about corrosion.

Next, a method of manufacturing the magnetic recording medium (DTR medium) according to the present invention is described with reference to FIGS. 6A to 6F. In the figures, although the processing is to be performed only on one side of the substrate, the processing is actually performed on the both sides of the substrate.

Figure 6A:
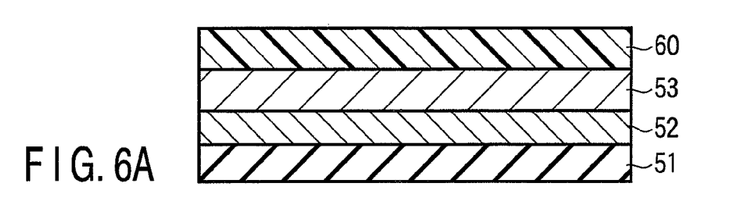
FIGS. 6A to 6F are cross-section views showing a method of manufacturing the magnetic recording medium according to the present invention.

As is shown in FIG. 6A, the soft magnetic underlayer 52 and the magnetic material 53 comprising ferromagnetic crystals are deposited on the substrate 51. Although not shown, an etching protective film may be formed on the magnetic material 53. A resist 60 is applied to the magnetic material 53.

The substrate 51 includes, for example, a glass substrate, aluminum alloy substrate, a ceramic substrate, a carbon substrate, a Si single crystal substrate having an oxide surface, and a substrate obtained by plating these substrates with NiP.

As the soft magnetic underlayer 52, a material containing Fe, Ni, or Co is used. More specifically, the soft magnetic underlayer 52 includes FeCo-based alloy such as FeCo and FeCoV, FeNi-based alloy such as FeNi, FeNiMo, FeNiCr and FeNiSi, FeAl-based alloy and FeSi-based alloy such as FeAl, FeAlSi, FeAlSiCr, FeAlSiTiRu, and FeAlO, FeTa-based alloy such as FeTa, FeTaC, and FeTaN, and FeZr-based alloy such as FeZrN.

As the magnetic material 53, for example, a magnetic material comprising a CoCrPt alloy and an oxide and having perpendicular magnetic anisotropy is used. As the oxide, silicon oxide or titanium oxide is particularly suitable.

The etching protective film includes, for example, diamond-like carbon and carbon nitride.

The resist 60 is used as a mask material for processing the magnetic material 53 into protrusions and recesses after the patterns of protrusions and recesses are transferred to the resist 60 in the next step of imprinting. As the resist, a material which can be applied and to which patterns of protrusions and recesses can be transferred by imprinting is used. The material of the resist includes, for example, a polymer material, a low-molecular organic material, and a liquid Si resist. In this embodiment, spin-on-glass (SOG) which is a type of the liquid Si resist is used.

Figure 6B:
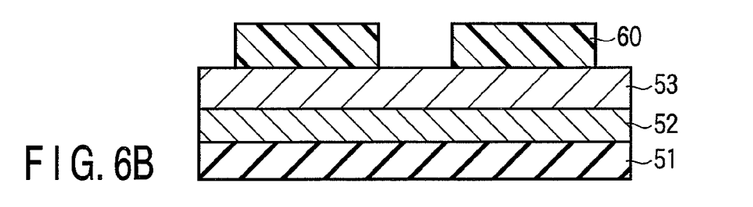

As shown in FIG. 6B, the patterns of protrusions and recesses are transferred by imprinting. In the transfer process, an imprinting apparatus is used which can transfer the patterns to both sides simultaneously. Imprint stampers (not shown) with desired patterns of protrusions and recesses formed thereon are uniformly impressed against the entire surfaces of the resists (SOG) applied to both sides of the substrate to transfer the patterns of protrusions and recesses to the surfaces of the resists 60. The recesses formed in the resist 60 by the transfer process correspond to the non-recording regions.

Figure 6C:
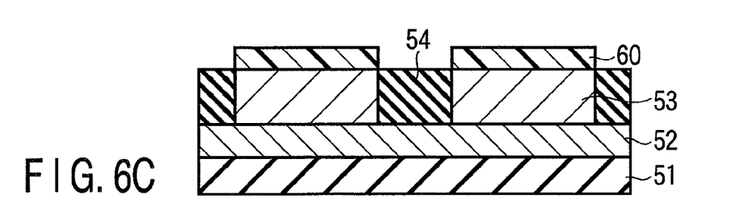

As shown in FIG. 6C, oxidation treatment is performed for the surface of the magnetic material 53 exposed without being masked with the resist 60. The magnetic material 53 in the exposed portions loses magnetic property by the oxidation treatment, and the portions converted into non-recording regions 54. As a result, the patterns of the magnetic material isolated by the non-recording regions 54 become the recording regions.

Figure 6D:
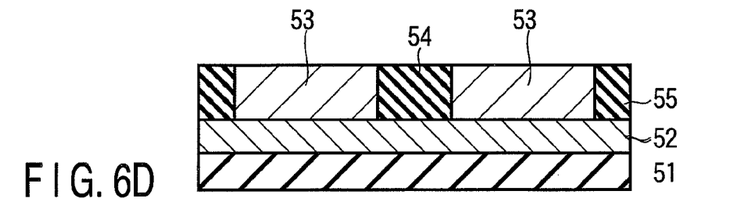

As shown in FIG. 6D, the resist 60 remaining on the recording regions is removed by etching. It is preferable that the resist 60 made of SOG is etched using a fluorine compound. When a resist made of carbon is used, it is preferable that the resist is subjected to ashing with oxygen.

Figure 6E:
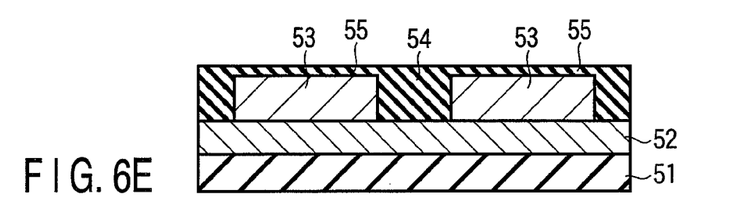

As shown in FIG. 6E, oxidation treatment is performed to form the surface oxide films 55 made of an oxide having a desired thickness, that is, a thickness of 1 nm or more, on the surfaces of the recording regions 53. Owing to the surface oxide films 55, the phenomenon that the interfaces between the recording regions 53 and the non-recording regions 54 are exposed to the surface of the magnetic recording layer can be avoided.

Figure 6F:
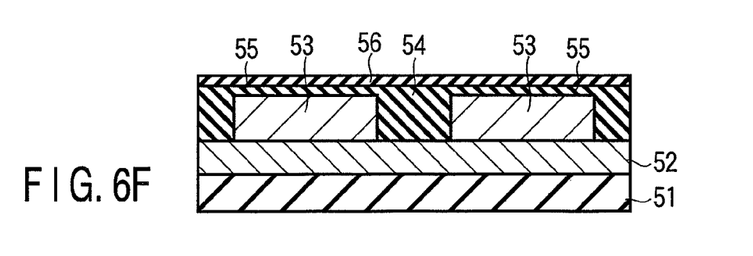

As shown in FIG. 6F, the protective film 56 made of DLC is formed on the non-recording regions 54 and the surface oxide films 55. Thereafter, a lubricant is applied to the protective film 56, and thus the magnetic recording medium according to the present invention is completed.

Figure 7:
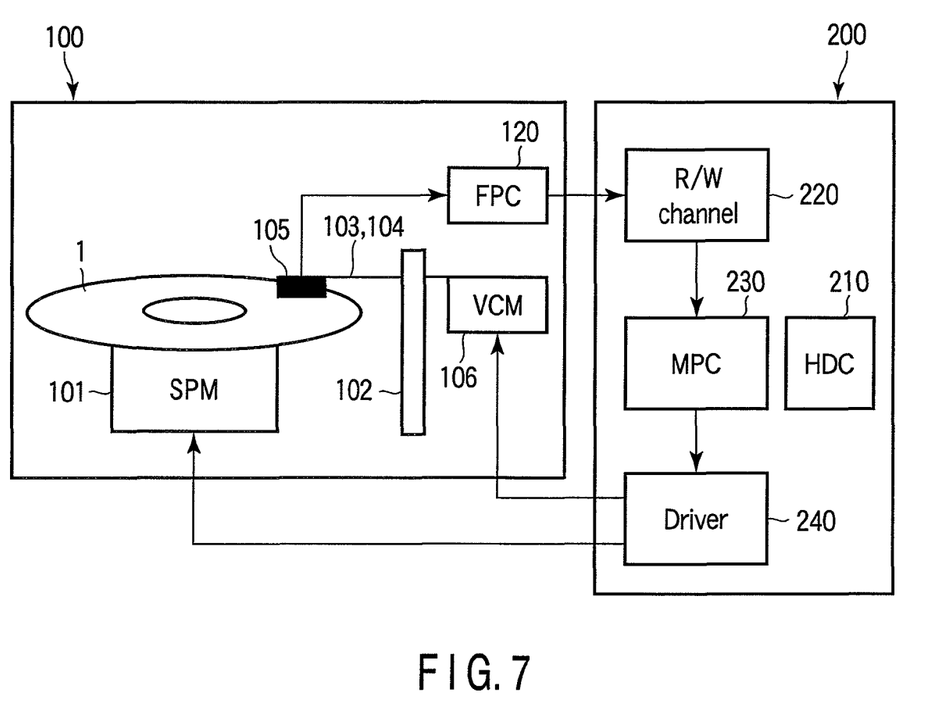
FIG. 7 is a block diagram of the magnetic recording apparatus according to an embodiment of the present invention.

Now, a magnetic recording apparatus having the magnetic recording medium according to the present invention will be described. FIG. 7 shows a block diagram of the magnetic recording apparatus according to an embodiment of the present invention. The figure shows a head slider only over a top side of the magnetic recording medium. However, a perpendicular magnetic recording layer having discrete tracks is formed on both sides of the magnetic recording medium. A down head and an up head are provided over the top side and under the bottom side of the magnetic recording medium, respectively. The configuration of the magnetic recording apparatus according to the present invention is basically similar to that of the conventional magnetic recording apparatus except that the former uses the magnetic recording medium according to the present invention.

A disk drive includes a main body portion called a head disk assembly (HDA) 100 and a printed circuit board (PCB) 200.

The head disk assembly (HDA) 100 has a magnetic recording medium (DTR medium) 1, a spindle motor 101 that rotates the magnetic recording medium 1, an actuator arm 103 that moves around a pivot 102, a suspension 104 attached to a tip of the actuator arm 103, a head slider 105 supported by the suspension 104 and including a read head and a write head, a voice coil motor (VCM) 106 that drives the actuator arm 103, and a head amplifier (not shown) that amplifies input signals to and output signals from the head. The head amplifier (HIC) is provided on the actuator arm 103 and connected to the printed circuit board (PCB) 200 via a flexible cable (FPC) 120. Providing the head amplifier (HIC) on the actuator arm 103 as described above enables an effective reduction in noise in head signals. However, the head amplifier (HIC) may be fixed to the HDA main body.

The perpendicular magnetic recording layer is formed on both sides of the magnetic recording medium 1 as described above. On each of the opposite perpendicular magnetic recording layers, the servo zones are formed like circular arcs so as to coincide with the locus along which the head moves. Specifications for the magnetic recording medium satisfy an outer diameter, an inner diameter, and read/write properties which are adapted for the drive. The radius of the circular arc formed by the servo zone is given as the distance from the pivot to the magnetic head element.

Four main system LSIs are mounted on the printed circuit board (PCB) 200. The four main system LSIs include a disk controller (HDC) 210, a read/write channel IC 220, a MPU 230, and a motor driver IC 240.

The MPU 230 is a control section for a driving system and includes ROM, RAM, CPU, and a logic processing section which are required to implement a head positioning control system according to the present embodiment. The logic processing section is an arithmetic processing section composed of a hardware circuit to execute high-speed arithmetic processes. The firmware (FW) for the logic processing section is stored in ROM. MPU controls the drive in accordance with FW.

The disk controller (HDC) 210 is an interface section in the hard disk and exchanges information with an interface between the disk drive and a host system (for example, a personal computer), MPU, the read/write channel IC, and the motor driver IC to control the entire drive.

The read/write channel IC 220 is a head signal processing section composed of a circuit which switches a channel to the head amplifier (HIC) and which processes read/write signals.

The motor driver IC 240 is a driver section for the voice coil motor (VCM) 77 and the spindle motor 72. The motor driver IC 240 controls the spindle motor 72 to a given rotation speed and provides a VCM manipulation variable from MPU 230 to VCM 77 as a current value to drive a head moving mechanism.

Hereinafter, examples of the present invention will be described.

EXAMPLE 1

As a mold for forming patterns, a Ni imprint stamper with a thickness of 0.4 mm was prepared. The Ni imprint stamper was produced to form the signal area having the innermost peripheral radius of 4.7 mm and the outermost peripheral radius of 9.7 mm in which a track pitch was set to 104 nm so that the patterns on the stamper corresponded to FIG. 1. The depth of the recesses on the stamper was set to 50 nm.

A troidal glass disk with a diameter of 48 mm and an inner diameter of 12 mm was used as a substrate. FeCoV was deposited in a thickness of 100 nm as a soft magnetic underlayer. A ferromagnetic layer as a magnetic material having a composition comprising CoCrPt alloy and $SiO_2$ was deposited in a thickness of 15 nm. A DLC film as an etching protective film was deposited in a thickness of 30 nm. SOG as a resist was applied by spin coating in a thickness of 50 nm.

The above imprint stamper was impressed against the resist applied to the substrate for 1 minute at a normal temperature and at a pressure of 200 MPa under atmospheric pressure, whereby the patterns of protrusions and recesses of the imprint stamper were transferred to the surface of the resist. The depth of the recesses on the resist was equal to the depth of the recesses on the imprint stamper, that is, 50 nm.

By performing etching with a $CF_4$ gas, resist residues remaining on the bottoms of the recesses of the resist were removed to expose the surface of the DLC protective film in the portions corresponding to the non-recording regions. The resist (SOG) was formed into protrusions in the portions corresponding to the recording regions. By performing etching with oxygen using the resist (SOG) patterns as masks, the DLC protective film located in the recesses was removed completely to the thickness of 30 nm to expose the magnetic material.

By performing etching with a $CF_4$ gas, the resist (SOG) patterns remaining on the protrusions were removed.

By performing oxidation treatment with oxygen, the magnetic film exposed in the recesses was oxidized so as to lose magnetic property, whereby the non-recording regions were formed. At the same time, the recording regions formed of the magnetic patterns isolated by the non-recording regions were formed.

By performing etching with oxygen, the DLC protective films remaining on the recording regions were removed. Further, the magnetic material on the surfaces of the recording regions was oxidized to form surface oxide films.

Some samples were taken out at that stage and observed with a cross-sectional TEM. As a result, the surfaces of the recording regions were covered with the surface oxide films with a thickness of 1 nm, where a crystal lattice was not observed. The crystal lattice was observed in the recording region under the surface oxide film. The crystal lattice was not observed also in the non-recording regions. Thus, it was found that an oxide was formed by the oxidation treatment with oxygen, whereby it was made amorphous. The surface of the sample was subjected to Kerr measurement. Thus, it was found that the magnetic property was lost by a volume ratio corresponding to the oxide in the non-recording regions and the oxide on the surfaces of the recording regions in predetermined patterns.

Finally, a protective film made of DLC with a thickness of 4 nm was formed on the non-recording regions and the surface oxide films, and then a lubricant was applied to the protective film to manufacture the DTR medium according to the present invention.

EXAMPLE 2

As with Example 1, the following steps were performed: depositing the soft magnetic underlayer, the magnetic material, and the etching protective film (DLC) onto the substrate; applying the resist (SOG); forming the resist patterns by imprinting; removing the resist residues in the recesses (i.e., non-recording regions); removing the etching protective film (DLC) in the recesses (i.e., non-recording regions); removing the resist (SOG) patterns in the protrusions by etching with a $CF_4$ gas; forming the non-recording regions by oxidation treatment; and removing the etching protective film (DLC) on the protrusions by etching with oxygen. Further, the magnetic material on the surfaces of the recording regions was oxidized to form surface oxide films under the condition that the time for oxidation was set to as three times as that in Example 1.

Some samples ware taken out at that stage and observed with a cross-sectional TEM. As a result, the surfaces of the recording region were covered with the surface oxide films with a thickness of 3 nm, where a crystal lattice was not observed. The crystal lattice was observed in the recording region under the surface oxide film. The crystal lattice was not observed also in the non-recording regions. Thus, it was found that an oxide was formed by the oxidation treatment with oxygen, whereby it was made amorphous. The surface of the sample was subjected to Kerr measurement. Thus, it was found that the magnetic property was lost by a volume ratio corresponding to the oxide in the non-recording regions and the oxide on the surfaces of the recording regions in predetermined patterns.

Finally, a protective film made of DLC with a thickness of 4 nm was formed on the non-recording regions and the surface oxide films, and then a lubricant was applied to the protective film to manufacture the DTR medium in Example 2.

COMPARATIVE EXAMPLE 1

As with Example 1, the following steps were performed: depositing the soft magnetic underlayer, the magnetic material, and the etching protective film (DLC) onto the substrate; applying the resist (SOG); forming the resist patterns by imprinting; removing the resist residues in the recesses (i.e., non-recording regions); removing the etching protective film (DLC) in the recesses (i.e., non-recording regions); removing the resist (SOG) patterns in the protrusions by etching with a $CF_4$ gas; forming the non-recording regions by oxidation treatment; and removing the etching protective film (DLC) on the protrusions by etching with oxygen. However, no oxidation treatment for the magnetic material on the surfaces of the recording regions was performed.

Some samples ware taken out at that stage and observed with a cross-sectional TEM. As a result, a crystal lattice was observed on the surface of the recording region. Meanwhile, the crystal lattice was not observed in the non-recording region. Thus, it was found that an oxide was formed by the oxidation treatment with oxygen, whereby it was made amorphous. The surface of the sample was subjected to Kerr measurement. Thus, it was found that the magnetic property was lost by a volume ratio corresponding to the oxide in the non-recording regions in predetermined patterns.

Finally, a protective film made of DLC with a thickness of 4 nm was formed on the non-recording regions and the surface oxide films, and then a lubricant was applied to the protective film to manufacture the DTR medium in Comparative Example 1.

COMPARATIVE EXAMPLE 2

As with Example 1, the following steps were performed: depositing the soft magnetic underlayer, the magnetic material, and the etching protective film (DLC) onto the substrate;

applying the resist (SOG); forming the resist patterns by imprinting; removing the resist residues in the recesses (i.e., non-recording regions); removing the etching protective film (DLC) in the recesses (i.e., non-recording regions); removing the resist (SOG) patterns in the protrusions by etching with a $CF_4$ gas; forming the non-recording regions by oxidation treatment; and removing the etching protective film (DLC) on the protrusions by etching with oxygen. Thereafter, an $Al_2O_3$ film with a thickness of 1 nm was deposited on the surface thereof, instead of performing oxidation treatment to the surfaces of the recording regions.

Some samples ware taken out at that stage to perform observation and compositional analysis with a cross-sectional TEM. As a result, the surface of the recording region was covered with the $Al_2O_3$ film with a thickness of 1 nm, and a crystal lattice was not observed in this region. The crystal lattice was observed in the recording region under the $Al_2O_3$ film. The crystal lattice was not observed also in the non-recording region. Thus, it was found that an oxide was formed by the oxidation treatment with oxygen, whereby it was made amorphous. The surface of the sample was subjected to Kerr measurement. Thus, it was found that the magnetic property was lost by a volume ratio corresponding to the oxide in the non-recording regions in predetermined patterns.

However, when the surface was observed with AFM, there were micro-cracks. Such cracks were not observed in Examples 1 and 2 and Comparative Example 1. Therefore, it is considered that the cracks were produced due to deteriorated adhesiveness of the $Al_2O_3$ film.

Finally, a protective film made of DLC with a thickness of 4 nm was formed on the $Al_2O_3$ film, and then a lubricant was applied to the protective film to manufacture the DTR medium in Comparative Example 2.

(Evaluation)

The magnetic recording media in Examples 1 and 2 and Comparative Examples 1 and 2 were evaluated for corrosion test and bit error rate the measurement. The results are shown in Table 1.

TABLE 1

|  | Surface oxide film | Corrosion test | BER |
| --- | --- | --- | --- |
| Example 1 | oxide of magnetic material 1 nm | good | −6.5 |
| Example 2 | oxide of magnetic material 3 nm | good | −4.5 |
| Comparative Example 1 | none | poor | −7.0 |
| Comparative Example 2 | $Al_2O_3$ 1 nm | poor | −6.5 |

The corrosion test was performed as follows. Each magnetic recording medium in Examples 1 and 2 and Comparative Examples 1 and 2 was left for 40 hours under a high temperature and humidity environment of 80° C. and 80%, and bright spots occurring due to corrosion on the surface thereof were checked.

There were no bright spots on each medium of Examples 1 and 2, showing a good result in the corrosion test. Meanwhile, each medium in Comparative Examples 1 and 2 exhibited about one to two bright spots per 1 $cm^2$ after the test, showing that these media did not pass the corrosion test.

It was found that media of Examples 1 and 2 have resistance to corrosion because the surface thereof was covered with the oxide of the magnetic material. Meanwhile, in the medium of Comparative Example 1, interfaces between the recording regions and the non-recording regions are formed just below the protective film, and therefore, it is considered that corrosion occurred due to water penetrating through the interfaces. In the medium of Comparative Example 2, although an $Al_2O_3$ film is formed on the surface thereof, the adhesiveness between the magnetic material of the recording regions and the $Al_2O_3$ film having a composition different from that of the magnetic material is poor, leading to corrosion occurred from the portions where cracks were produced.

The bit error rate was measured as follows. A drive with the media in Examples 1 and 2 and Comparative Examples 1 and 2 mounted thereto was fabricated. Each medium was produced at a track density of 244 kTPI (track pitch of 104 nm), and recorded at a linear recording density of 1260 kBPI. With respect to each medium, the bit error rate was measured in the intermediate region in the radial direction.

A common perpendicular recording medium was manufactured by depositing a continuous film of a magnetic material on a glass substrate, depositing a DLC protective film with a thickness of 4 nm, and applying a lubricant. Then the resultant medium was mounted to the drive which was the same as the above one. When the bit error rate was measured in the intermediate region in the radial direction, it was found to be the power of −7.0. However, with respect to the perpendicular recording medium, when 1000 times of recording were performed for the adjacent track at a track pitch of 104 nm and then the bit error rate was measured for the original track, it was found to be the power of −3.6, and thus, showing poor resistance to adjacent recording.

The bit error rates for the drives with the media of Examples 1 and 2 and Comparative Examples 1 and 2 mounted thereto measured in the intermediate region in the radial direction were found to be the power of −6.5, −4.5, −7.0 and −6.5, respectively.

The medium of Comparative Example 1 has the recording regions just below the protective film, which means that the magnetic spacing is smaller compared with other media. It is considered as the reason why the bit error rate was low. However, the medium of Comparative Example 1 had extremely poor corrosion resistance.

The medium of Example 2 exhibited good result in the corrosion test, but a higher bit error rate compared with other media. The medium of Example 2 has the surface oxide film with a thickness of 3 nm under the protective layer, and therefore has a large magnetic spacing. In addition, the thick surface oxide film, which is an oxide of the magnetic material, brings about a thin recording layer. Therefore, the medium of Example 2 exhibited the higher bit error rate. However, although the bit error rate is somewhat high, that does not significantly influence read/write properties.

The medium of Comparative Example 2 has the $Al_2O_3$ film with the same thickness as the oxide in the medium of Example 1 under the protective film, and therefore exhibited the bit error rate equivalent to that of the medium of Example 1. However, the medium of Comparative Example 2 had poor corrosion resistance due to cracks produce in the $Al_2O_3$ film.

The medium of Example 1 has the surface oxide made of the oxide of the magnetic material with a thickness of 1 nm under the protective film. Therefore, the medium of Example 1 exhibited a slightly higher bit error rate than that of the medium of Comparative Example 1, but did not exhibited so high as that of the medium of Example 2. In addition, the medium of Example 1 exhibited a very good corrosion resistance.

The bit error rates for the drives with the media of Examples 1 and 2 and Comparative Examples 1 and 2 mounted thereto measured in the intermediate region in the radial direction were found to be the power of −6.5, −4.5, −7.0 and −6.5, respectively.

With respect to the drives with the media in Examples 1 and 2 and Comparative Examples 1 and 2 (with a track pitch of 104 nm) mounted thereto, when 1000 times of recording were performed for the adjacent track at a track pitch of 104 nm and then the bit error rate was measured for the original track, it was found to be the power of −5.5, −3.7, −6.0 and −5.5, respectively. This means that these media exhibited higher adjacent recording resistance than that of the common perpendicular recording medium having the continuous film.

As described above, the discrete track media according to the present invention can exhibit excellent corrosion resistance without degrading read/write properties.

What is claimed is:

1. A magnetic recording medium comprising:
   recording regions comprising patterns of a magnetic material corresponding to servo signals and recording tracks;
   non-recording regions between the recording regions, the non-recording regions comprising an oxide of the magnetic material of the recording regions; and
   nonmagnetic surface oxide films on surfaces of the recording regions, the nonmagnetic surface oxide films comprising an oxide of the magnetic material of the recording regions.

2. The magnetic recording medium of claim 1, wherein both the nonmagnetic surface oxide films on the surfaces of the recording regions and the oxide films of the non-recording regions have a thickness of 1 nm or greater at the boundaries between the recording regions and the non-recording regions.

3. A magnetic recording apparatus comprising the magnetic recording medium of claim 1.

* * * * *